United States Patent [19]

Ridderström

[11] 4,181,465

[45] Jan. 1, 1980

[54] APPARATUS UTILIZING MAGNETIC MEANS FOR TRANSFERRING ARTICLES TO AND FROM PREDETERMINED POSITIONS

[75] Inventor: Göran A. H. Ridderström, Taby, Sweden

[73] Assignee: Aktiebolaget Electrolux, Stockholm, Sweden

[21] Appl. No.: 899,823

[22] Filed: Apr. 25, 1978

Related U.S. Application Data

[63] Continuation of Ser. No. 732,714, Oct. 15, 1976, abandoned, which is a continuation of Ser. No. 549,740, Feb. 13, 1975, abandoned.

[51] Int. Cl.² .............................................. B65G 47/90
[52] U.S. Cl. ...................................... 414/590; 310/38; 414/226; 414/744
[58] Field of Search ................ 214/1 BC, 1 R, 1 BD, 214/1 CM, 1 BB, 1 BV, 1 BT, 1 BH, 147 T; 310/36, 37, 38; 235/151.1, 151.11; 414/589, 590, 744, 225, 226

[56] References Cited

U.S. PATENT DOCUMENTS

| 2,973,107 | 2/1961 | Cherel | 214/1 CM |
| 2,996,330 | 8/1961 | Hutto | 214/1 CM X |
| 3,002,138 | 9/1961 | Byrnes | 310/38 X |
| 3,349,261 | 10/1967 | Horsley | 310/36 |
| 3,760,956 | 9/1973 | Burch | 214/1 BC X |

*Primary Examiner*—Frank E. Werner
*Attorney, Agent, or Firm*—Alfred E. Miller

[57] ABSTRACT

Apparatus for handling materials, such as robots, in which the transfer units are connected with drive that cause the swinging movement of the transfer units between two positions about a neutral position located therebetween. Retaining are disposed on the apparatus in the form of magnetic members for either engaging the respective transfer unit or repelling the same.

6 Claims, 4 Drawing Figures

APPARATUS UTILIZING MAGNETIC MEANS FOR TRANSFERRING ARTICLES TO AND FROM PREDETERMINED POSITIONS

The present invention relates to a robot assembly for transferring articles or materials from one position to another position and is continuation of Ser. No. 732,714, filed Oct. 15, 1976, now abandoned, which was a continuation of Ser. No. 549,740, filed Feb. 13, 1975, now abandoned.

BACKGROUND OF THE INVENTION

Apparatus for transferring articles from one location to another are known as robots, and are capable of transferring articles between two end positions, and can move vertically and horizontally as well as performing rotational movements. Furthermore, the drive systems heretofore used in robot constructions are preferably pneumatic or hydraulic. In addition, electric motors have often been used. Most all of these systems are both complicated and expensive to manufacture.

SUMMARY OF THE INVENTION

It is an object of the present invention to provide a robot assembly which is relatively simple in construction yet is reliably effective for the purposes intended.

Another object of the present invention is to provide transfer units which are given a swinging motion by the robot drive unit. This swinging motion is interrupted by retaining means in the form of magnetic members when the transfer unit is in their respective end positions.

It is a further object of the present invention to utilize drive members in the form of spring means, which in a neutral position between the end positions, do not exert any force on the transfer unit but in the end positions act on the unit by generally equal but oppositely directed forces.

The invention will now be more fully described with reference to the accompanying drawings, in which.

DESCRIPTION OF THE PREFERRED EMBODIMENT

Figure 1:
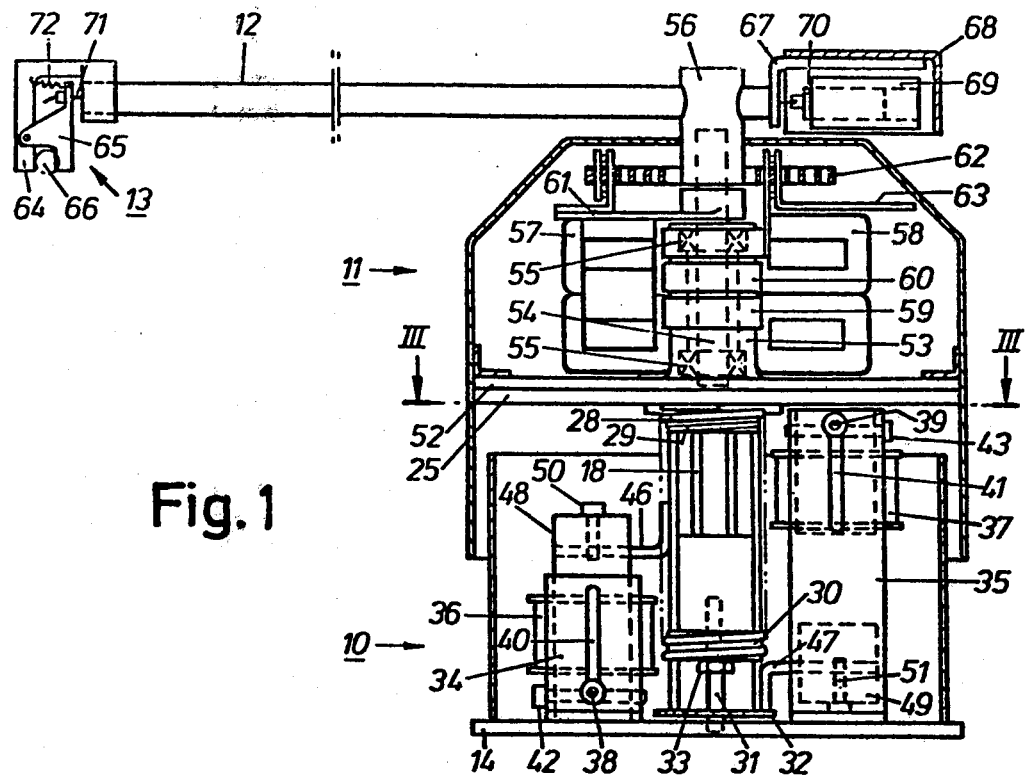
FIG. 1 is a side elevational view, partly in section, of the robot apparatus for transferring articles showing the drive system together with cooperating structure for performing both vertical longitudinal movement as well as horizontal rotary movement in accordance with the teachings of the present invention.

Referring to FIG. 1, the robot apparatus discloses three modules which co-act to perform different operations. The unit referred to generally by the reference numeral 10 is a vertical movement unit. The rotary movement unit is referred to generally by the reference numeral 11 while the gripper device 13 is shown mounted on the elongated arm 12. There is provided drive systems for both the vertical movement unit 10 and the rotary movement unit 11. Furthermore, a selected drive system can be utilized to move the arm 12 in a direction parallel to its length. A drive system can also be used to operate a unit for tilting the apparatus at an angle to the surface it rests upon. This tilting unit may be mounted between the vertical movement unit and the rotary movement unit.

Figure 4:
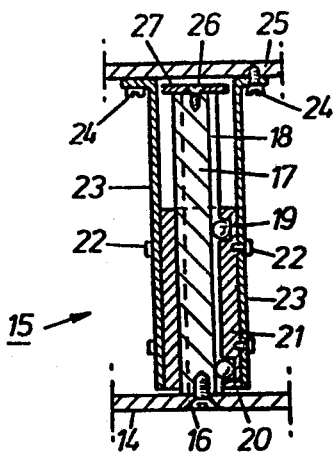
FIG. 4 is a sectional view of a detail of construction being a part of the guide unit for vertically longitudinal movement.

As seen in FIG. 1, the vertical movement unit 10 is mounted on a base plate 14, the latter supporting a guide unit 15 comprising a rod 17 attached to the base plate 14 by means of a screw 16. The guide unit 15 is further provided with four elongated grooves 18 for seating ball bearings 19. The balls 19 are maintained into engagement with the grooves 18 by means of square bushings 21 having grooves 20 for receiving the balls. The bushing 21 is attached to plates 23 by means of screws 22 (FIG. 4). Furthermore, the plates 23 are attached by means of screws 24 to a mounting plate 25, which, as shown in FIG. 1, supports the rotary movement unit 11. The plates 23 together with the mounting plate 25 forms the mobile part of the vertical movement unit 10. Referring to FIG. 4, it will be seen that the upper end of the rod 17 supports a stop plate 27 which is secured thereto by means of a screw 26, and which prevents the balls 19 from escaping entrapment in the grooves 18.

An helical spring 28 is clamped between the base plate 14 and the mounting plate 25. As seen in FIG. 1, the upper end of spring 28 is secured to a pin 29 which, in turn, is attached to the mounting plate 25. The opposite or bottom end of spring 28 is secured to the disc 30 in which an adjustment screw 31 is threaded. A wheel 32 is connected to the adjustment screw and can be rotated to the desired position in order to set the adjustment screw 31. Furthermore, as seen in FIG. 1, the bottom end of the adjustment screw is fitted into a hole in the base plate 14 and rests against the bottom of the hole. Thus, when the adjustment screw 31 is turned by means of the wheel 32 the disc 30 is moved either upwardly or downwardly whereby the neutral position can be set about which the vertical swinging movement occurs. It should be noted that when setting the neutral position, the weight of the parts involved in the vertical movement has to be considered. Thereafter, the disc 30 can be locked in the preselected set position by means of a lock nut 33.

Figure 3:
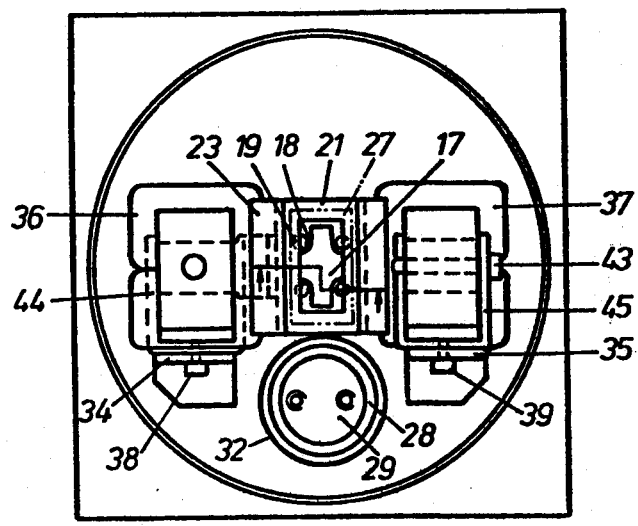
FIG. 3 is a sectional view taken along the line III—III of FIG. 1.

As seen in FIGS. 1 and 3 rails 34 and 35 are mounted on the base plate 14. Each of the rails supports a respective electromagnet 36 or 37 which are attached thereto by means of screws 38 and 39 which are movable to selected positions in the elongated holes or slots 40 and 41 in the support rails 34 and 35. This arrangement provides the adjustability of the positions of the electromagnets 36 and 37 in the apparatus. The electromagnets 36 and 37 are removably attached by screws 42 and 43 to corresponding U-shaped brackets 44 and 45 in which the screws 38 and 39 engage.

Referring to FIG. 1, the angle brackets 46 and 47 are shown with permanent magnets 48 and 49 secured thereto by means of screws 50 and 51 which are disposed on the plates 23 fastened to the mounting plate 25.

Figure 2:
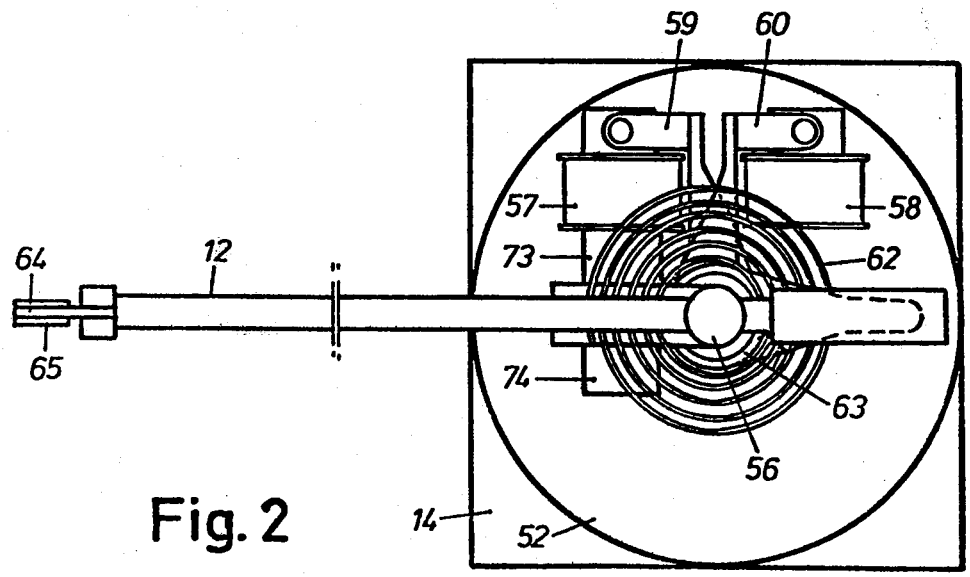
FIG. 2 is a top plan view of the robot apparatus shown in FIG. 1.

The base plate 52 for the rotary movement unit 11 is secured to the mounting plate 25 of the vertical movement unit 10. The base plate 52 is further provided with an upstanding tube 53 in which a shaft 54 is journalled by means of ball bearings 55. A sleeve 56 fits over the top of shaft 54 and supports the arm 12 which is fitted to the upper end of said shaft. The arm can then pivot between the end positions determined by the electromagnets 57 and 58 supported by holders 59 and 60 which are removably clamped on the tube 53. This arrangement is particularly seen in in FIG. 2. The positions of the electromagnets 57 and 58 can be readily altered by turning the corresponding holder 59 or 60, respectively. Furthermore, it should be observed that the permanent magnet 73 and 74 are mounted on a holder 61 which is clamped on the shaft 54 and co-acts with said electromagnets.

In order to operate the arm 12 and, as seen in FIG. 1, a coiled spring 62 of the clockwork type is clamped between the holder 61 and the holder 63 which are, in turn, clamped on the tube 53. The neutral position can be set by turning the holder 63 about which the arm 12 makes a swinging movement.

Referring to FIG. 1, it will be noted that the gripper device 13 is shown secured to one end of the arm 12 and includes a stationary arm 64, as well as a movable arm 65 journalled in the stationary arm 64 and co-acting therewith in order to grasp an article 66. An angle bracket 67 is mounted on the other end of the arm 12 with a sleeve 68 attached thereto. The sleeve 68 mounts an electromagnet 69 having a movable armature 70 to which one end of a wire 71 is fastened. The other end of the wire 71 is fastened to a movable gripper arm 65 and acts on the gripper arm against the force of spring 72. The spring 72 is mounted on the one end on the movable arm 65 and at the other end on the stationary arm 64.

The operation of the robot apparatus is as follows:

Assuming that the article 66 has just been grasped by the gripper device 13, the transfer units then assume the position shown in FIG. 1. In this condition the vertical movement unit 10 moves a rotary movement unit 11 with the arm 12, and the article 66 to the other end position, as determined by the electromagnet 37. Thereafter, the rotary unit 11 turns 180° from the position shown in FIG. 2 to the end position determined by the electromagnet 58. Finally, the gripper device 13 delivers the article 66 to a receiving station (not shown). It should be noted that all electromagnets shown in the present apparatus are connected to a central control unit (not shown) from which the required electrical current is supplied.

Current is supplied to the electromagnet 36 to excite the same and generate a repulsion field of opposite direction to the magnetic field emanating from the permanent magnet 48. Simultaneously, the electromagnet 37 is excited by means of the application of electrical current thereto and thereby generate an attraction field in the same direction as the magnetic field emanating from the permanent magnet 49. The vertical movement unit 10 is released to move toward the upper end position and an upwardly directed swinging motion is initiated under the action of the spring 28. In the initial stage of movement, this motion receives an additional force by the relative repulsion of the electromagnet 36 and a permanent magnet 48. Consequently, the spring 28 is capable of forcing the mobile part of the vertical movement unit 10 to a location near the upper end position thereof. The mobile part is then moved to the upper end position under the action of the relative attracting forces of the electromagnet 37 and the permanent magnet 49.

When the vertical movement unit 10 has performed its upward movement the electromagnet 57 is excited by the application of current thereto to generate a repulsion field counteracting the field generated by the permanent magnet 73. Simultaneously therewith, the electromagnet 58 is excited to generate an attraction field co-acting with the magnetic field generated by the permanent magnet 74. As a result of the foregoing functions the arm 12 is released and a swinging motion toward the opposite end position is started under the action of the spring 62. As is the case in a vertical movement, a pulling force is added to the spring 62 in the initial stage, the result being the relative repulsion of the electromagnet 57 and the permanent magnet 73. Moreover, the spring 62 moves the arm 12 to a position in which the permanent magnet is so close to the electromagnet 58 that it is engaged by the attractive force generated by the electromagnet and moved by this force to abut the electromagnet.

Thus, when the rotary unit 11 has accomplished its prescribed movement, the electromagnet 69 is acted upon and the gripper device delivers the article 66 to a pre-determined location.

The movement of the gripper device 13 back to its starting position shown in FIG. 1 occurs according to a similar pattern as that described hereinabove. However, the difference is that the electromagnets which, according to the foregoing description, have been excited to generate a repulsion field are instead excited to generate an attraction field. Moreover, since the magnetic repulsion fields are active only in the initial stage of the swinging motion, the electric current to the relevant electromagnet can be disconnected during the continued movement in order to save energy.

It should be apparent that the robot transfer assembly as set forth hereinabove, is a relatively simple construction but functions as a reliably operating apparatus.

What is claimed is:

1. Robot apparatus for transferring articles to and from predetermined positions comprising a base member, two transfer mechanisms which are supported by said base member, said transfer mechanisms each comprising a movable member and drive means operatively connected to said movable member whereby movement of each of the movable members is in one direction and in an opposite direction in a substantially linear path about a neutral position located between two end positions, one of said movable members having an arm provided with a gripping member for gripping and holding an article during transfer and moving the same about a plane parallel to the plane of said base member, said transfer mechanisms co-acting to selectively move said gripping member between predetermined positions, and each transfer mechanism having means to provide limited motion and hold the movable member in either end position, and said drive means including a spring acting as a main energy source for said movable member, and said limited motion means forcing said movable member a distance corresponding to the energy losses occurring in said apparatus.

2. Robot apparatus as claimed in claim 1 wherein means for providing limited motion is an electromagnet, and said movable member being provided with a ferromagnetic part arranged thereon and adapted to co-act with said electromagnet.

3. Robot apparatus as claimed in claim 1 wherein said means for providing limited motion are electromagnets arranged on each of said transfer mechanisms, and corresponding permanent magnets are arranged on each of said movable members for co-action with said electromagnets, the magnetic field generated in each of said two end positions having the same direction as the magnetic field emanating from the respective permanent magnet.

4. Robot apparatus as claimed in claim 3 further comprising means for adjusting said electromagnets in order to determine the end positions of said transfer mechanisms.

5. Robot apparatus as claimed in claim 1 wherein said spring is of the clockwork type and one of said movable members is an arm having a turning shaft for pivotal support, said arm being capable of rotating in a substantially horizontal plane, a stationary holder, and said spring being mounted around said turning shaft and clamped between said arm and said stationary holder.

6. Robot apparatus for transferring articles to and from predetermined positions comprising a base member, a transfer mechanism being supported by said base member, said transfer mechanism including a movable member and a drive means operatively connected to said movable member whereby movement of the movable member is in one direction and in an opposite direction in a substantially linear path about a neutral position located between said two end positions, said movable member having an arm provided with a gripping member for gripping and holding an article during transfer and moving the same about a plane parallel to the plane of said base member, and said transfer mechanism having means to provide limited motion and hold the movable member in either end position, and said drive means including a spring acting as a main energy source for said movable member, and said limited motion means forcing said movable member a distance corresponding to the energy losses occurring in said apparatus.

* * * * *